3,354,538
BERYLLIUM FOIL FABRICATION
Jerry L. Cadden and Dan H. Friar, Oak Ridge, Tenn., assignors to the United States of America as represented by the United States Atomic Energy Commission
No Drawing. Filed Nov. 23, 1965, Ser. No. 510,153
5 Claims. (Cl. 29—423)

ABSTRACT OF THE DISCLOSURE

Beryllium foil of a nominal thickness of about 0.0025 of an inch is prepared by first enclosing beryllium sheet of about 0.25 of an inch or less in thickness in an envelope of a material exhibiting a reduction ratio similar to that of beryllium, e.g., mild steel or SAE 4340 steel. The envelope is sealed to provide an air-tight assembly which is then rolled to the desired thickness at a temperature of about 600°–800° C. and thereafter heated to a temperature of about 600°–800° C. and rapidly cooled to effect the release of the beryllium foil from the envelope material.

---

The invention described herein was made in the course of, or under, a contract with the U.S. Atomic Energy Commission. This invention relates generally to beryllium foil, and more particularly to the fabrication of beryllium foil by rolling techniques.

Beryllium metal has been successfully formed into sheets of thickness of about 0.020 of an inch by practicing presently known rolling techniques. However, the fabrication of beryllium foil, i.e., a beryllium body having a thickness less than about 0.005 of an inch, by previous techniques presented considerable shortcomings or drawbacks which hindered and discouraged the production of thin beryllium foils. Perhaps the most acceptable beryllium foil formed by practicing a previous technique was prepared by placing a beryllium sheet of about 0.025 of an inch thick in a covering or jacket of stainless steel, e.g., 305L stainless steel, and disposing narrow strips of steel of preferably the same thickness as the beryllium sheet between the plates as to completely encompass the peripheral edges of the beryllium sheet, welding this assembly around the edges, and thereafter heating and rolling the package to reduce the beryllium to the desired thickness. Inasmuch as rolling work hardens the stainless steel when the beryllium is of some thickness greater than desired, e.g., 0.007 of an inch, the beryllium is extracted from the jacket and re-encapsulated in a new stainless steel jacket with side strips around the peripheral edges of the beryllium for permitting further reduction of the beryllium. Also, the deformation rates of the beryllium and the stainless steel of the jacket are different as to cause creasing, wrinkling, and/or tearing of the beryllium metal.

Physical bonding or adherence of the beryllium metal to the stainless steel jacket frequently occurs as to prevent or render extremely difficult the separation of the beryllium foil from the jacket. The occurrence of such bonding or adherence in one location of the jacket may cause other portions of the foil to wrinkle and effect surface or subsurface defects in the foil product. In attempts to overcome this bonding problem, many types of release agents, such as, for example, zirconia; a mixture of aluminum phosphate, water, and clay; and the like, have been tried. However, the release agents provided only limited success and in portions of the foil where creasing or wrinkling did not occur there was frequently adherence of the foil to the stainless steel jacket. Furthermore, some release agents reacted with the beryllium to deposit an adherent coating on the beryllium that subsequently had to be etched away or otherwise removed. Thin portions or uneven thicknesses of the foil are also believed due to "flakes" of the release agent becoming embedded in the foil during rolling. Subjecting the foil to an etchant for removing the release agent often results in holes in the foil where the foil is thinner. Thus, the quantity and quality of acceptable foil produced in any particular rolling operation may be quite small. Cleaning the beryllium sheet surfaces prior to encapsulating was also tried in an effort to overcome the bonding problem, but little improvement was obtained.

Efforts to use jackets of "softer" materials, e.g., mild steels, rather than rigid materials such as stainless steel, Hastelloy, and the like have been discouraged by previous technology for several reasons. For example, previous teachings suggest that in order to obtain acceptable product foil which is free from oxidation and other surface defects, the jacket must be made of an oxide-free material capable of maintaining the foil shape during rolling and be sufficiently resistant to oxidation so as to provide acceptable oxide-free surface finishes on product foil. Also, the previous teachings appear to emphasize that foil release from the jacket material cannot be satisfactory unless the jacket material is sufficiently "hard" as to minimize bonding due to the high temperatures used during the rolling operation.

Another disadvantage of the beryllium foil fabricating techinques previously practiced is that foils in a size range of about 4 inches wide and about 10 to 12 inches long were about the largest foils producible and then with only limited success. Attempts to increase the size of the product foil to greater than about the above-mentioned size have not been significantly successful.

The present invention aims to overcome or substantially minimize the above and other shortcomings or drawbacks encountered by previous techniques in the production of beryllium foil. The present invention achieves these unique features by encapsulating a clean beryllium sheet in an air-tight envelope of a metal such as mild steel, SAE 4340 steel, or a metal having similar characteristics that is free of scale and oxide. Conventional rolling techniques are acceptable, but the rolling temperatures are preferably at least 600° C. to assure minimal foil cracking. Oxidation of the beryllium foil is not a problem due to the utilization of a sealed envelope and "clean" envelope material. Bonding or adhesion of the beryllium foil to the envelope material does not occur or is negligible due to the utilization of a novel treatment which readily effects the release of the foil from the envelope material. This unique treatment consists of heating the package or canned beryllium assembly after the rolling schedule is completed to a temperature at least as great and preferably higher than the rolling temperature and thereafter rapidly cooling the package to effect a "thermal shock" at the interfaces between the beryllium foil and the envelope material for facilitating the release or separation of the beryllium from the steel envelope at about room temperature.

An object of the present invention is to provide improved beryllium foils of thicknesses of about 0.005 of an inch (5 mils) or less.

Another object of the present invention is to provide a new and improved method of fabricating beryllium foil.

Another object of the present invention is to utilize mild or SAE 4340 steels as envelope materials in the fabrication of thin beryllium foil by rolling techniques.

A further object of the present invention is to utilize a novel heat treatment after foil formation to facilitate separation of beryllium from surrounding envelope materials.

A still further object of the present invention is to minimize or obviate beryllium foil oxidation.

A still further object of the present invention is to provide beryllium foil of substantially larger surface area than previously attainable.

Other and further objects of the invention will be obvious upon an understanding of the illustrative embodiment about to be described, or will be indicated in the appended claims, and various advantages not referred to herein will occur to one skilled in the art upon employment of the invention in practice.

The present invention comprises the reduction of beryllium sheets to beryllium foil by rolling procedures. The beryllium sheets used as the starting material for foil production may be prepared from berrylium billets by utilizing any suitable well known rolling procedure which is capable of reducing a billet to a sheet having a thickness of about 250 mils or less. Oxidation of the beryllium metal in the reduction from billet to sheet size is not a problem since the oxide surfaces may be readily removed by suitable etchants or other well known techniques. Also, the beryllium sheets are of sufficient thickness so that they may be removed from the rolling jacket, if such is used, with little difficulty.

A beryllium sheet formed in the above or other manner may be "cut" into a desired size, as will be discussed in greater detail below, and thereafter etched to a bright surface finish to remove contaminants and oxidation. A suitable etchant may comprise a solution containing about 260 milliliters (ml.) phosphoric acid ($H_2PO_4$), about 25 mls. sulfuric acid ($H_2SO_4$), and saturated with chromic oxide ($CrO_3$).

In order to roll the cleaned beryllium sheet to foil thickness without encountering the undesirable oxidation problems, the sheet is sealed in an envelope of mild steel or SAE 4340 steel which has been previously cleaned of any visible scale or oxidation by chemical or mechanical means. The envelope may be formed by sandwiching the beryllium sheet between two plates of steel which project over or overlap peripheral edges of the beryllium sheet. The exposed edges of the plates are then welded together to seal the envelope and thereby provide an air-tight structure or assembly. The welding may be accomplished in any suitable manner such as by heliarc welding or by any other satisfactory welding technique. Care should be exercised to assure that the weld metal is not substantially harder or of different expansion ratios than the envelope material to minimize the "breaking" of the welds during rolling.

The air-tight sealing of the envelope is an important feature of the present invention in that oxidation of the beryllium metal is essentially entirely inhibited if an air-tight envelope is maintained throughout the rolling operation.

Another important feature is the use of mild steel or SAE 4340 steel as the envelope material. These steels were previously considered undesirable because of oxidation and other rolling problems in foil production. However, it has been found that these previous considerations are not necessarily valid and that such steels as jacket or envelope material, in fact, offer significant advantages over the materials previously used. For example, wrinkling, creasing, or tearing of the beryllium foil during rolling is minimal or non-existent due to the close relationship of the rolling rates or deformation ratios of the jacket material and the beryllium. Oxidation is also minimal or non-existent when using the above-mentioned steel jacket materials since the air-tight envelope isolates the encased beryllium from oxidizing atmospheres during rolling. The beryllium foil is readily separated from mild and SAE 4340 steel envelopes by utilizing a novel final treatment as will be described in greater detail below.

A beryllium sheet encapsulated in an envelope as described above may be thoroughly heated to a temperature of at least about 600° C. to as high as about 800° C. in a conventional furnace or other suitable heating mechanism. The heated envelope assembly may then be rolled in a conventional rolling mill while employing relatively light reductions or heavy reductions up to about 30 percent per pass, as desired. During rolling the assembly may be reheated between successive passes through the rolls.

Upon reduction of the beryllium sheet within the envelope to beryllium foil of the desired thickness, the envelope assembly may then be subjected to the novel heating and cooling treatment of the present invention to effect the release or separation of the envelope material from the fragile beryllium foil. This treatment may be achieved by heating the rolled envelope assembly in a suitable heating facility for about 30 to about 60 minutes at a temperature of about 600° C. to about 800° C. and thereafter rapidly cooling the assembly to room temperature. This final heating and cooling operation is believed to effect a "thermal shock" between the beryllium foil and the envelope material for breaking or otherwise rendering ineffective the bond or adhesion therebetween. When cool, the edges of the envelope are sheared or the weldment otherwise broken and the beryllium readily removed. No bonding or adhesion of the foil to the envelope material is encountered. During this final treatment the temperature of the assembly may be at least as high as the rolling temperature and is preferably higher than the rolling temperature. The cooling portion of this treatment may be effected in any suitable manner, such as, for example, by placing the envelope assembly on a cool flat surface such as a concrete floor or air cooling in any other desired manner. Further, the final treatment also provides another advantage in that it anneals the beryllium foil.

The bonding release obtained by the above-described final treatment is unique with the mild and SAE 4340 steels or materials having similar physical properties in that such a treatment will not effect the release of the beryllium foil from the envelope when the material of the latter is stainless steel, Hastelloy, or the like.

The surface finish of the beryllium foil rolled in an envelope of mild steel is relatively rough when compared to the surface finish obtained by rolling small pieces of foil in stainless steel. However, foil rolled in mild steel requires neither the use of a release agent nor etching and is of a smoothness acceptable for most uses. The surface finish on foil rolled in SAE 4340 steel is generally of the same quality surface finish as that of foil rolled in stainless steel.

Inasmuch as beryllium foil rolled in envelopes of mild steel or SAE 4340 steel requires no etching, the thickness variations of the product foil are less than that of foil rolled in stainless steel and foils having nominal thicknesses of about 2.5 mils may be readily prepared.

A characteristic found to be common with both the mild and the SAE 4340 steels is that they possess reduction ratios similar to each other and to the beryllium. In other words both the over-all assembly and the individual components of the assembly enjoy essentially the same reduction rates.

In order to better understand the present invention a typical rolling operation for reducing a beryllium sheet of about 25 mils down to a foil of 2.5 mils will be described. The initial starting size of beryllium is dependent upon the desired size of the foil.

A beryllium sheet of 25-mil thickness may be cut into a piece about 2.5 inches long by 6.5 inches wide and sealed in an envelope of mild steel. The envelope may be made up of two cover plates having dimensions of about 3 inches long by 7 inches wide and about 0.125 inch thick. The envelope is welded about the edges thereof to provide an air-tight or vacuum-tight structure.

The canned assembly may then be heated to 750° C. and reduced by rolling at a rate of about 25 percent per pass. The canned assembly may be reheated between each pass to maintain the 750° C. rolling temperature. After rolling the assembly is heated for about one hour at 750° C. to anneal the beryllium and effect release of the foil from the envelope material.

It will be seen that the present invention sets forth improved beryllium foil fabrication whereby the monetary savings realized and the production increase over previous beryllium foil techniques are substantial. The size of the foil produced by practicing the present invention is limited only by the capacity of the rolling mill used. Also, beryllium foil of about 2.5-mil thickness is readily fabricated whereas foil of such a thickness was previously unobtainable or obtainable with great difficulty and then in only very small and limited amounts.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

What is claimed is:

1. A method of preparing beryllium foil of a thickness of about 0.005 of an inch or less, comprising the steps of enclosing a beryllium sheet in an envelope of a material having a reduction ratio similar to that of beryllium, sealing the envelope to provide an air-tight assembly, rolling the envelope assembly at a temperature within the range of about 600° C. to about 800° C. to reduce the beryllium sheet to foil, heating the rolled envelope assembly to a temperature within the range of about 600° C. to about 800° C., and thereafter rapidly cooling the assembly to effect release of the beryllium foil from the envelope.

2. The method claimed in claim 1, wherein said material is a metal selected from the group consisting of mild steel and SAE 4340 steel.

3. The method claimed in claim 1, wherein the beryllium sheet is about 0.025 of an inch thick.

4. The method claimed in claim 1, wherein the heating of the rolled envelope assembly is to a temperature of at least as great as the rolling temperature, and wherein the heating of the rolled envelope assembly is provided by heating the latter for a duration of about 30 to about 60 minutes in an environment maintained at a temperature within the range of about 600° C. to about 800° C.

5. The method claimed in claim 1, wherein the beryllium foil is of a nominal thickness of about 0.0025 of an inch.

References Cited

UNITED STATES PATENTS

| | | | |
|---|---|---|---|
| 2,653,494 | 9/1953 | Creutz | 29—423 |
| 2,837,817 | 6/1958 | Kelley | 29—424 |
| 3,263,319 | 8/1966 | Tifft et al. | 29—423 |

THOMAS H. EAGER, *Primary Examiner.*